US011770443B2

(12) United States Patent
Dekel et al.

(10) Patent No.: US 11,770,443 B2
(45) Date of Patent: Sep. 26, 2023

(54) DETECTING ANOMALIES IN A DISTRIBUTED APPLICATION

(71) Applicant: VMware, Inc., Palo Alto, CA (US)

(72) Inventors: Edo Yacov Dekel, Tel-Aviv (IL); Haim Helman, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/736,851

(22) Filed: May 4, 2022

(65) Prior Publication Data
US 2022/0263894 A1   Aug. 18, 2022

Related U.S. Application Data

(63) Continuation of application No. 17/033,520, filed on Sep. 25, 2020, now Pat. No. 11,343,310.

(51) Int. Cl.
| | |
|---|---|
| *H04L 67/1029* | (2022.01) |
| *H04L 67/1031* | (2022.01) |
| *H04L 43/062* | (2022.01) |
| *H04L 47/783* | (2022.01) |
| *H04L 43/04* | (2022.01) |
| *H04L 67/1008* | (2022.01) |

(52) U.S. Cl.
CPC ......... *H04L 67/1029* (2013.01); *H04L 43/04* (2013.01); *H04L 43/062* (2013.01); *H04L 47/783* (2013.01); *H04L 67/1008* (2013.01); *H04L 67/1031* (2013.01)

(58) Field of Classification Search
CPC ... H04L 67/1029; H04L 43/04; H04L 43/062; H04L 47/783; H04L 67/1008; H04L 67/1031
See application file for complete search history.

(56) References Cited

U.S. PATENT DOCUMENTS

| | | | | |
|---|---|---|---|---|
| 10,824,726 | B1* | 11/2020 | Herman Saffar | G06F 21/566 |
| 11,513,842 | B2* | 11/2022 | Wang | G06F 9/4881 |
| 2019/0163559 | A1* | 5/2019 | Takahashi | G06F 11/0793 |
| 2019/0392354 | A1* | 12/2019 | Yang | G06N 20/00 |
| 2020/0151050 | A1* | 5/2020 | Takahashi | G06F 11/3409 |
| 2020/0252416 | A1* | 8/2020 | Niv | H04L 63/102 |
| 2022/0030051 | A1* | 1/2022 | Masnauskas | H04L 12/4633 |
| 2022/0300345 | A1* | 9/2022 | Reijonen | G06F 9/5022 |

OTHER PUBLICATIONS

The American Heritage College dictionary, 2002, Houghton Mifflin Company, fourth edition, p. 722 (Year: 2002).*

* cited by examiner

*Primary Examiner* — Philip C Lee
(74) *Attorney, Agent, or Firm* — Kim & Stewart LLP

(57) ABSTRACT

Anomalies are detected in a distributed application that runs on a plurality of nodes to execute at least first and second workloads. The method of detecting anomalies includes collecting first network traffic data of the first workload and second network traffic data of the second workload during a first period of execution of the first and second workloads, collecting third network traffic data of the first workload and fourth network traffic data of the second workload during a second period of execution of the first and second workloads, and detecting an anomaly in the distributed application based on a comparison of the third network traffic data against the first network traffic data or a comparison of the fourth network traffic data against the second network traffic data. Anomalies may also be detected by comparing network traffic data of two groups of containers executing the same workload.

18 Claims, 4 Drawing Sheets

DETECTING ANOMALIES IN A DISTRIBUTED APPLICATION

CROSS-REFERENCE

This application is a continuation of U.S. patent application Ser. No. 17/033,520, filed Sep. 25, 2020, which application is incorporated by reference herein in its entirety.

BACKGROUND

Techniques have been developed to detect anomalies in monolithic applications as a way to alert the user that malware might be present. Such techniques are not readily transportable to distributed applications, such as those deployed onto a Kubernetes® platform, which run as ephemeral containers within pods on different nodes of the Kubernetes platform. Detection of anomalies in distributed applications is quite different from detecting anomalies in monolithic applications for several reasons.

The distributed application is composed of several parts, each designed to execute a particular workload and thus behave differently from other parts. There is a need to understand the normal behavior of each part in order to detect whether a certain behavior is anomalous or not. By contrast, the monolithic application is a single unit of software and anomaly is detected when the software as a whole deviates from its expected behavior.

In distributed applications deployed onto a Kubernetes platform, data is distributed between pods and there is data traffic in and out of each pod. By contrast, data is maintained in a single place in a monolithic application and the only data traffic is data traffic in and out of the monolithic application. As a result, anomalous behavior in distributed applications may go undetected using anomalous detection techniques developed for monolithic applications which evaluate only the data traffic in and out of the applications for anomalous behavior.

Further, in distributed applications deployed onto a Kubernetes platform, pods in some sets, e.g., replica sets, are expected to behave similarly on average. In such situations, one of the pods in a set could behave anomalously or all of the pods in the set could behave anomalously. Anomalous detection techniques developed for monolithic applications may be unable to detect anomalous behavior when one of the pods in the set behave differently from other pods in the set.

DETAILED DESCRIPTION

One or more embodiments provide techniques for detecting anomalies in a distributed application. In particular, techniques described herein are able to detect anomalous behavior in a distributed application deployed onto a Kubernetes platform. The anomalous behavior may be detected in a set of pods executing one of the workloads of the distributed application or it may be detected in one of the pods in the set, based on a comparison with their respective past normal behavior. In addition, the anomaly may be detected in a pod based on a comparison with the behavior of other pods in the set.

Figure 1:
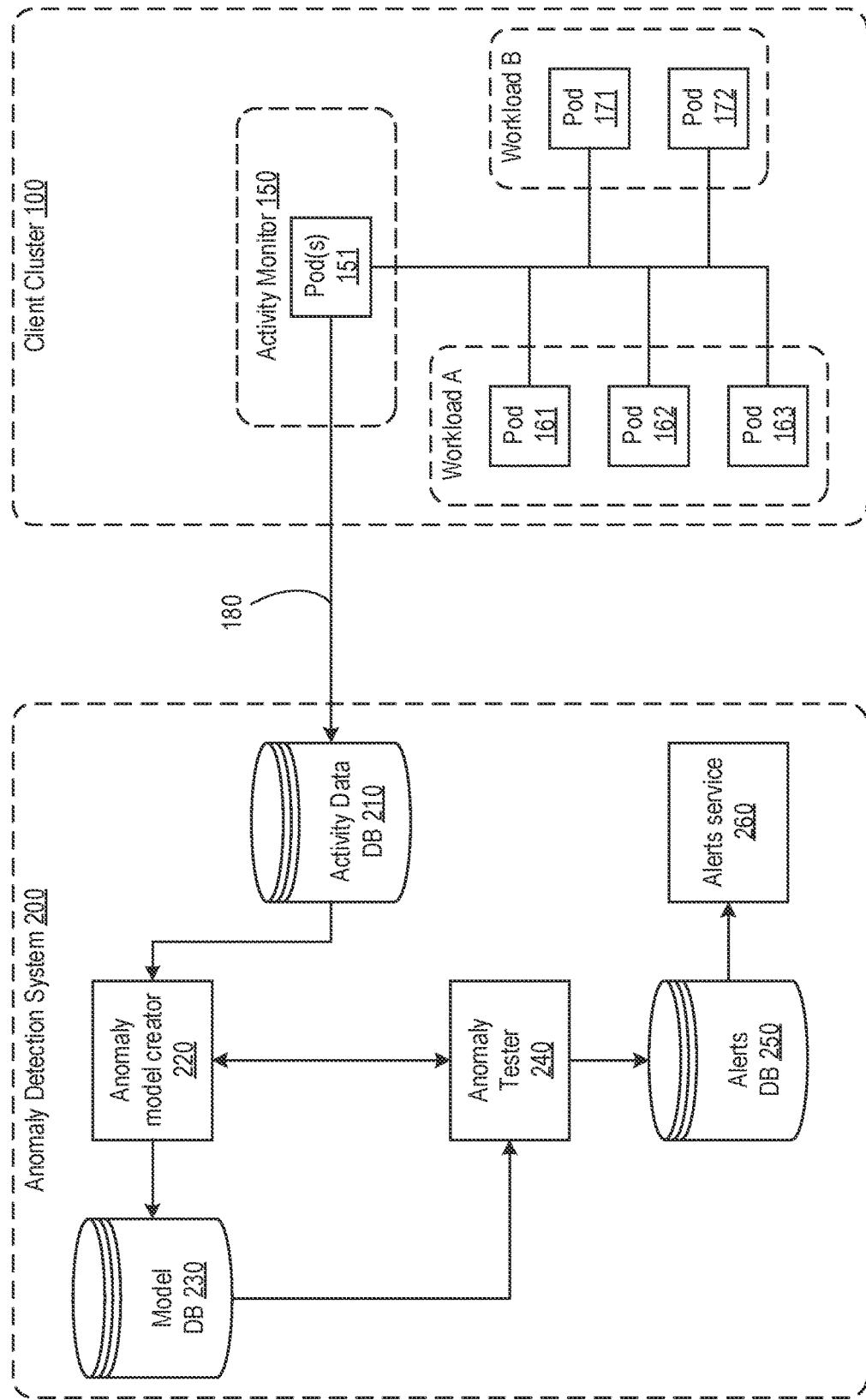
FIG. 1 illustrates a client cluster running a distributed application and an anomaly detection system according to embodiments.

FIG. 1 illustrates a client cluster 100 running a distributed application and an anomaly detection system 200 according to embodiments. In the embodiments illustrated herein, the distributed application is deployed onto a Kubernetes platform. However, in alternative embodiments, the distributed application may be deployed onto other types of computing environments.

Client cluster 100 is a Kubernetes cluster and to simplify the description, only pods 151 executing activity monitor 150, pods 161-163 executing Workload A, and pods 171-172 executing Workload B, all running in the Kubernetes cluster are shown. As is known in the art, pods run on nodes of the Kubernetes cluster, and one or more containers run inside pods. In addition, for illustrative purposes, Workload A and Workload B are depicted as workloads of the distributed application. In general, a distributed application may have any number of workloads.

In some embodiments, pods 161-163 form a replica set for executing Workload A and pods 171-172 form a replica set for executing Workload B. Pods of the same replica set are expected to behave similarly on average and are typically executed in different nodes. The idea behind creating a replica set with pods distributed across multiple nodes is to split the load of the of the workload computation among the multiple nodes. Therefore, in the embodiments where pods 161-163 form a replica set, each of pods 161-163 runs on different nodes of the Kubernetes cluster. Similarly, in the embodiments where pods 171-172 form a replica set, each of pods 171-172 runs on different nodes of the Kubernetes cluster.

One or more pods 151 of activity monitor 150 monitor data traffic between the pods, egress data traffic of the pods, and ingress data traffic of the pods, and collect activity data from the monitored data traffic, e.g., from packet headers of data packets that are transmitted or received by the pods. The collected activity data includes: port information (e.g., port number), protocol information (e.g., TCP), sender information (e.g., workload name for internal Kubernetes traffic or IP address for external non-Kubernetes traffic), and receiver information (e.g., workload name for internal, Kubernetes traffic or IP address for external non-Kubernetes traffic), of the data traffic into and out of the pods. Another one of pods 151 of activity monitor 150 then transmits the collected activity data to anomaly detection system 200, along with metadata that identifies the pod and the workload associated with the data traffic and whether the data traffic is egress data traffic, ingress data traffic, or inter-workload data traffic.

Anomaly detection system 200 includes databases and processes that are executed in one or more computing devices to perform anomaly detection according to embodiments. The databases include an activity data database 210, a model database 230, and an alerts database 250. The processes include an anomaly model creator 220, an anomaly tester 240, and an alerts service 260.

Anomaly detection system 200 may be provisioned in a public or private cloud computing environment, and even in the same data center in which client cluster 100 is provisioned. As such, the scope of embodiments is not limited to a particular computing environment of anomaly detection system 200. In addition, anomaly detection system 200 may be operated by a third party and connected to a plurality of client clusters of different organizations to whom the third party is providing anomaly detection services.

Activity data database 210 receives activity data from activity monitor 150 over a network 180 and stores the activity data in a structured manner for use by anomaly model creator 220. Anomaly model creator 220 examines the activity data stored by activity data database 210, and compiles the statistics in Table 1 from the activity data for each pod and each workload.

TABLE 1

| Egress Traffic | Ingress Traffic | Inter-Workload Traffic |
|---|---|---|
| Frequency of egress traffic to private IP addresses | Frequency of ingress traffic from private IP addresses | Message rate in data traffic to particular workload IDs |
| Frequency of egress traffic to public IP addresses | Frequency of ingress traffic from public IP addresses | Message rate in data traffic to all workloads |
| Egress traffic using specific domain | Message and error rates (for all ingress traffic) | Error rate in data traffic data traffic to particular workload IDs |
| Egress traffic using specific protocol | Message and error rates (for ingress traffic from specific IP addresses) | Error rate in data traffic to all workloads |
| Egress traffic using specific protocol:port | | Combined message rate and error rate in data traffic to particular workload IDs |
| Message and error rates (for all egress traffic) | | Combined message rate and error rate in data traffic to all workloads |
| Message and error rates (for egress traffic to specific IP addresses) | | |

During a time period designated by the administrator of client cluster 100 or during any time period where client cluster 100 is expected to exhibit normal behavior, the compiled statistics are stored in a structured manner by model database 230 as a reference model. The administrator of client cluster 100 has the option of instructing anomaly detection system 200 to delete a reference model, and designate another time period for collecting the activity data for creating the reference model. The instruction to delete the reference model may be given, for example, when the administrator of client cluster 100 detects malicious or unusual activity in client cluster 100 (e.g., by applying techniques known in the art) during the time period in which activity data used in creating the reference model is being collected. After the reference model has been created and maintained (not deleted), anomaly detection system 200 performs anomaly detection for client cluster 100 by performing the following steps.

First, activity data database 210 stores the activity data received from activity monitor 150 over network 180 in a structured manner. Second, anomaly model creator 220 examines the activity data stored by activity data database 210, and compiles the statistics in Table 1 from the activity data for each pod and each workload. Third, anomaly tester 240 compares the statistics compiled for each workload and each pod against the reference model and determines whether there are deviations from the normal behavior represented by the reference model in any of the pods or any of workloads that need to be flagged as anomalies. Alerts database 250 stores the flagged anomalies in a structured manner, and alerts service 260 issues alerts indicating the anomalies to client cluster 100 according to preferences set by the administrator of client system 200.

In the embodiments, anomaly tester 240 flags each of the behaviors listed in Table 2 of a pod or a workload, as an anomaly:

TABLE 2

| Egress Traffic | Ingress Traffic | Inter-Workload Traffic |
|---|---|---|
| Egress traffic is now present; no egress traffic before. | Ingress traffic is now present; no ingress traffic before. | Message rate in data traffic to a particular workload ID differs from one in reference model by more than a threshold percentage. |
| Egress traffic to private IP addresses not seen before. | Ingress traffic from private IP addresses not seen before. | Message rate in data traffic to all workloads differs from one in reference model by more than a threshold percentage. |
| Egress traffic to public IP addresses not seen before. | Ingress traffic from public IP addresses not seen before. | Error rate in data traffic data traffic to particular workload ID differs from one in reference model by more than a threshold percentage. |
| Egress traffic to a particular domain not seen before. | Message rate for all ingress traffic differs from one in reference model by more than a threshold percentage. | Error rate in data traffic to all workloads differs from one in reference model by more than a threshold percentage. |
| Egress traffic using a particular protocol not used before. | Error rate for all ingress traffic differs from one in reference model by more than a threshold percentage. | Combined message rate and error rate in data traffic to particular workload ID differs from one in reference model by more than a threshold percentage. |

TABLE 2-continued

| Egress Traffic | Ingress Traffic | Inter-Workload Traffic |
| --- | --- | --- |
| Egress traffic using a particular protocol: port not used before. | Message rate for ingress traffic to a specific IP address differs from a corresponding one in reference model by more than a threshold percentage. | Combined message rate and error rate in data traffic to all workloads differs from one in reference model by more than a threshold percentage. |
| Message rate for all egress traffic differs from one in reference model by more than a threshold percentage. | Error rate for ingress traffic to a specific IP address differs from a corresponding one in reference model by more than a threshold percentage. | |
| Error rate for all egress traffic differs from one in reference model by more than a threshold percentage. | | |
| Message rate for egress traffic to a specific IP address differs from a corresponding one in reference model by more than a threshold percentage. | | |
| Error rate for egress traffic to a specific IP address differs from a corresponding one in reference model by more than a threshold percentage. | | |

The threshold percentage for flagging a behavior listed in Table 2 as an anomaly is configurable, e.g., according to a preference of the administrator of client computer 100 or by anomaly detection system 200. In addition, different threshold percentages may be set for different behaviors listed in Table 2.

Figure 2:
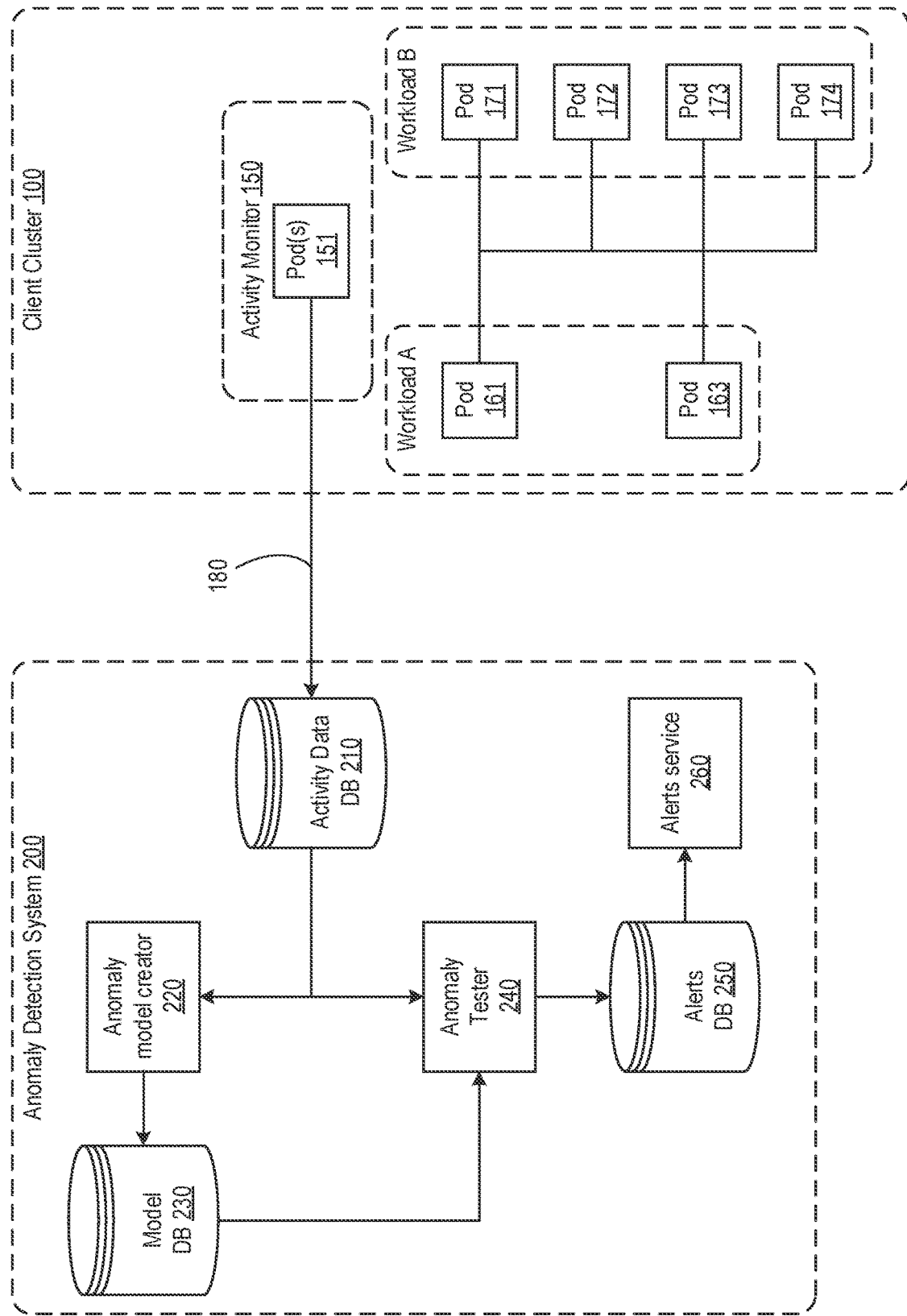
FIG. 2 also illustrates a client cluster running a distributed application with a modified configuration and the anomaly detection system according to embodiments.

Over time, the configuration of the distributed application may be modified so that a different number of pods execute the workloads of the distributed application. The configuration of the distributed application that is modified from that of FIG. 1 is depicted in FIG. 2. In FIG. 2, the number of pods executing Workload A decreased from three to two and the number of pods executing Workload B increased from two to four. In such situations, the reference model will need to be updated before it can be used to detect anomalous behavior.

In some embodiments, in addition to or alternative to comparing the statistics compiled for each pod against the reference model, anomaly tester 240 compares the statistics compiled for a pod based on activity data collected during a current anomaly detection period against the statistics compiled for other pods in the same replica set as the pod based on activity data collected during the current anomaly detection period. Any behavior listed in Table 3 that is observed in the pod but not in the other pods is flagged as an anomaly. Alerts database 250 stores the flagged anomalies in a structured manner, and alerts service 260 issues alerts indicating the anomalies to client cluster 100 according to preferences set by the administrator of client system 200. Because the comparisons in these embodiments are made against statistics that are compiled based on activity data collected during the same anomaly detection period, they may be used as the basis for detecting anomalies even after modifications are made to the configuration of the distributed application.

TABLE 3

| Egress Traffic of pod | Ingress Traffic | Inter-Workload Traffic |
| --- | --- | --- |
| Egress traffic is present; no egress traffic from other pods. | Ingress traffic is present; no ingress traffic to other pods. | Message rate in data traffic to a particular workload ID differs from those of other pods by more than a threshold percentage |
| Egress traffic to private IP addresses; no egress traffic from other pods to private IP addresses. | Ingress traffic to private IP addresses; no ingress traffic to other pods from private IP addresses. | Message rate in data traffic to all workloads differs from those of other pods by more than a threshold percentage |
| Egress traffic to public IP addresses; no egress traffic from other pods to public IP addresses. | Ingress traffic to public IP addresses; no ingress traffic to other pods from public IP addresses. | Error rate in data traffic data traffic to particular workload ID differs from those of other pods by more than a threshold percentage |
| Egress traffic to a particular domain; no egress traffic from other pods to the particular domain. | Message rate for all ingress traffic differs from those of other pods by more than a threshold percentage. | Error rate in data traffic to all workloads differs from those of other pods by more than a threshold percentage |
| Egress traffic using a particular protocol; no egress traffic from other pods using | Error rate for all ingress traffic differs from those of other pods by more than a | Combined message rate and error rate in data traffic to particular workload ID differs |

TABLE 3-continued

| Egress Traffic of pod | Ingress Traffic | Inter-Workload Traffic |
|---|---|---|
| the particular protocol. | threshold percentage. | from those of other pods by more than a threshold percentage |
| Egress traffic using a particular protocol: port; no egress traffic from other pods using the particular protocol: port. | Message rate for ingress traffic to a specific IP address differs from those of other pods by more than a threshold percentage. | Combined message rate and error rate in data traffic to all workloads differs from those of other pods by more than a threshold percentage |
| Message rate for all egress traffic differs from those of other pods by more than a threshold percentage. | Error rate for ingress traffic to a specific IP address differs from those of other pods by more than a threshold percentage. | |
| Error rate for all egress traffic differs from those of other pods by more than a threshold percentage. | | |
| Message rate for egress traffic to a specific IP address differs from those of other pods by more than a threshold percentage. | | |
| Error rate for egress traffic to a specific IP address differs from those of other pods by more than a threshold percentage. | | |

The threshold percentage for flagging a behavior listed in Table 3 as an anomaly is configurable, e.g., according to a preference of the administrator of client computer 100 or by anomaly detection system 200. In addition, different threshold percentages may be set for different behaviors listed in Table 3.

Figure 3:
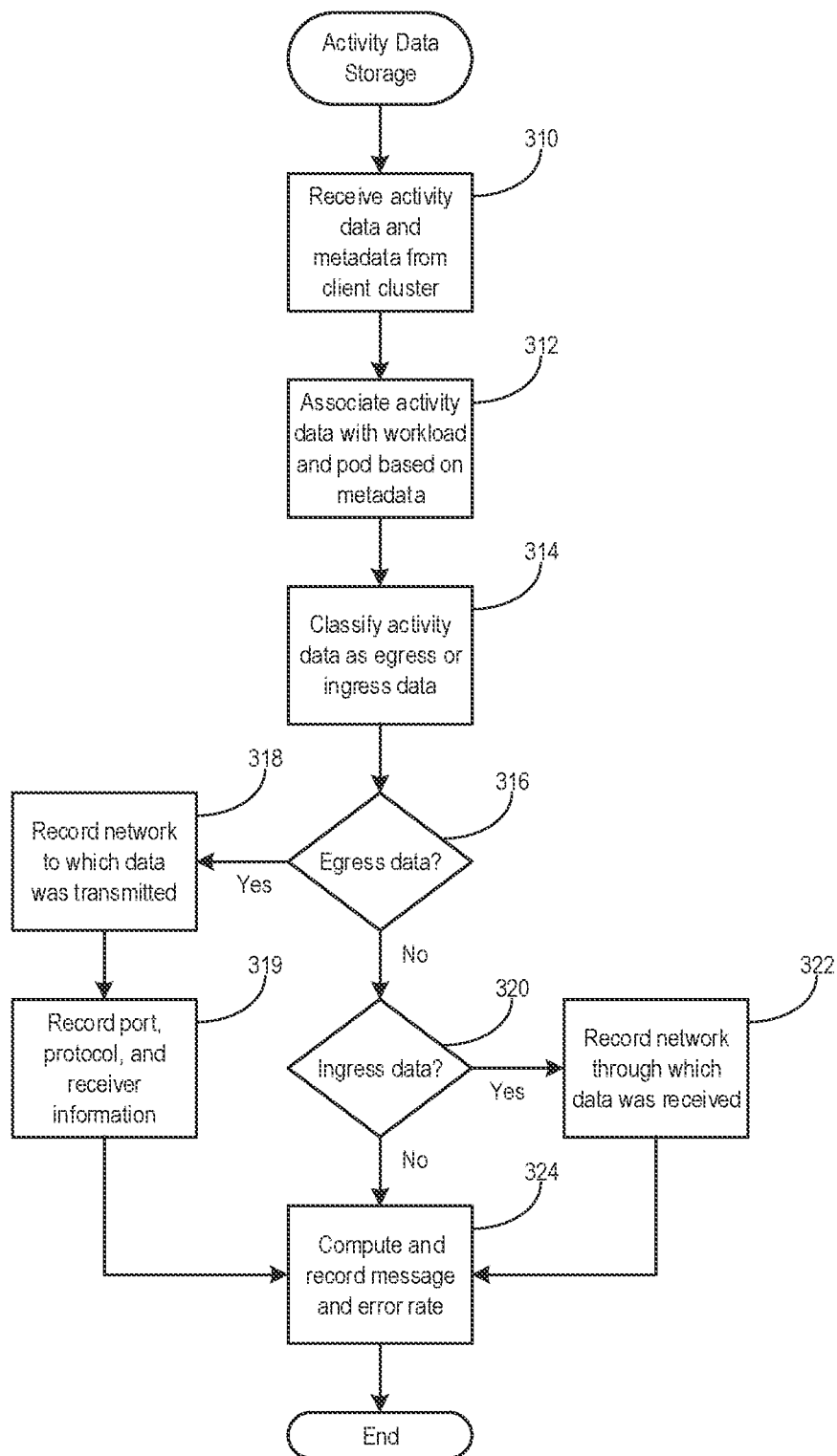
FIG. 3 is a flow diagram that illustrates the steps of storing activity data for compiling statistics for detecting anomalies, according to embodiments.

FIG. 3 is a flow diagram that illustrates the steps of storing activity data for compiling statistics for detecting anomalies, according to embodiments. The steps of FIG. 3 is carried out by activity data database 210, and begin at step 310 where activity data database 210 receives activity data and associated metadata from client cluster 100. Then, activity data database 210 at step 312 associates the received activity data with a pod ID and a workload ID, that are specified in the received metadata, and at step 314 classifies the received activity data as egress data or ingress data according to the received metadata.

If the received activity data is egress data (step 316, Yes), activity data database 210 at step 318 records in association with each of the pod ID and the workload ID, whether or not the data is transmitted to a public network (e.g., to public IP addresses) or to a private network (e.g., to private IP addresses). Then, activity data database 210 at step 319 records in association with each of the pod ID and the workload ID, the port, protocol, and destination information that are in the collected activity data.

If the received activity data is ingress data (step 316, No; step 320, Yes), activity data database 210 at step 322 records in association with each of the pod ID and the workload ID, whether or not the data is received from a public network (e.g., from public IP addresses) or from a private network (e.g., from private IP addresses).

If the received activity data is neither egress data nor ingress data (step 316, No; step 320; No), activity data 210 determines that the activity data is associated with inter-workload traffic and step 324 is executed for the inter-workload data. Step 324 is also executed for egress data (after step 319) and for ingress data (after step 322). The message rates and error rates that are computed and recorded by activity data database 210 include all of the message and error rates listed in Table 3. The process ends after step 324.

Figure 4:
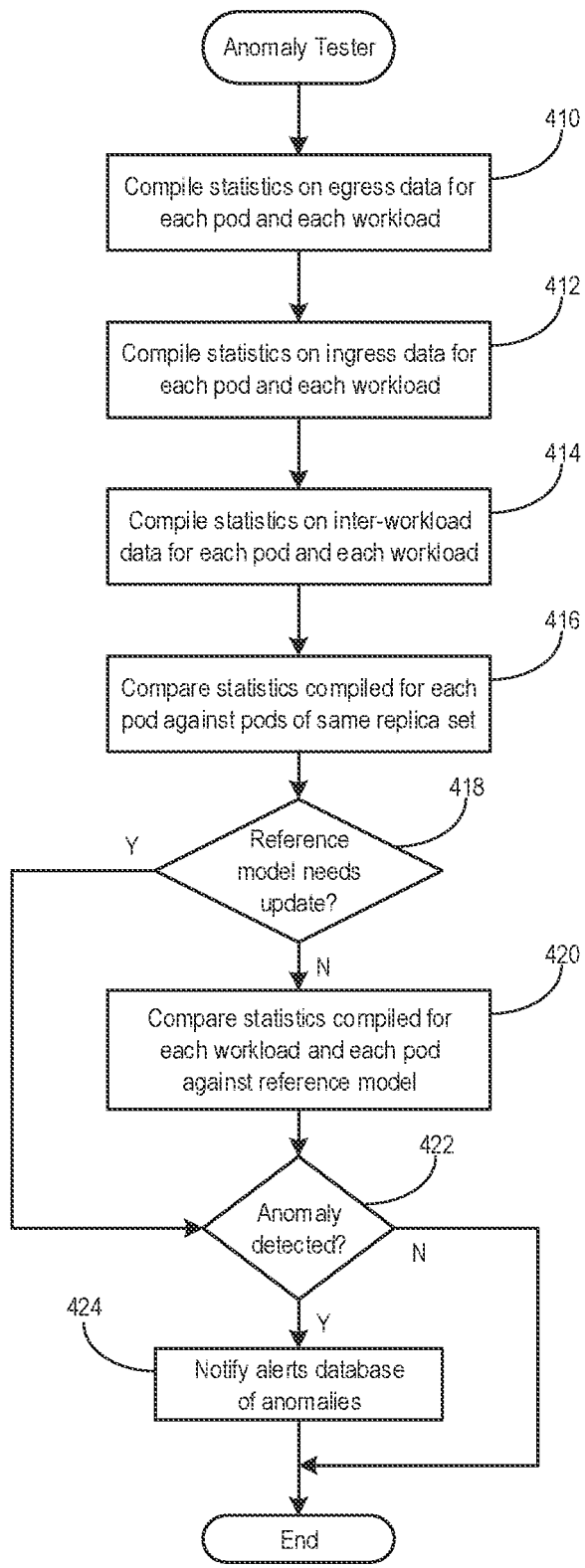
FIG. 4 is a flow diagram that illustrates the steps of detecting anomalies in a distributed application using the compiled statistics, according to embodiments.

FIG. 4 is a flow diagram that illustrates the steps of detecting anomalies in a distributed application using the compiled statistics, according to embodiments. The method of FIG. 4 is executed by anomaly tester 240 each time new activity data is stored by activity data database 210. Alternatively, the method of FIG. 4 may be executed by anomaly tester 240 according to a periodic schedule or after a predefined amount of new activity data is stored by activity data database 210.

The method of FIG. 4 begins with steps 410, 412, and 414, where anomaly tester 240 compiles statistics on egress data, ingress data, and inter-workload data for each pod and each workload based on the activity data stored by activity data database 210. Then, at step 416, anomaly tester 240 compares the statistics compiled for each pod against pods that are in the same replica set. Any behavior listed in Table 3 that is observed in the pod but not in the other pods is flagged as an anomaly. If the reference model is still valid for comparison because the distributed application has not gone through a change in its configuration since the last update of the reference model (step 418, No), anomaly tester 240 compares the statistics compiled for each workload and each pod against the reference model. Any behavior listed in Table 2 that is observed in the pod or the workload is flagged as an anomaly. Step 422, which is described below, is executed after step 420.

If the reference model is not valid for comparison because the distributed application has gone through a change in its configuration since the last update of the reference model (step 418, Yes), anomaly tester 240 skips step 420 and executes step 422. At step 422, anomaly tester 240 determines if an anomaly is detected by the comparison made at step 416 or step 420. If so (step 422, Yes), anomaly tester 240 at step 424 notifies alerts database 250 of the detected anomalies, in response to which alerts database 250 stores the detected anomalies in a structured manner, and alerts service 260 issues alerts indicating the anomalies to client cluster 100 according to preferences set by the administrator of client system 200. The process terminates after step 424 or if no anomaly is detected by the comparison made at step 416 or step 420 (step 422, No).

If the reference model is not valid for comparison because the configuration of the distributed application has been modified since the last update of the reference model, anomaly model creator 220 updates the reference model based on activity data generated after the configuration of the distributed application has been modified. After the update, anomaly tester 240 performs both the comparison of step 416 and the comparison of step 420.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of detecting anomalies in a distributed application that runs on a plurality of nodes to execute a plurality of workloads, comprising:
   collecting first network traffic data of the workloads at a number of different times during a first period of execution of the workloads, the first network traffic data including egress traffic data, ingress traffic data, and inter-workload traffic data;
   collecting second network traffic data of the workloads at a number of different times during a second period of execution of the workloads after the first period of execution, the second network traffic data including egress traffic data, ingress traffic data, and inter-workload traffic data; and
   detecting an anomaly in the distributed application based on a comparison of a frequency of private IP addresses specified in the egress traffic data in the collected first network traffic data and a frequency of private IP addresses specified in the egress traffic data in the collected second network traffic data.

2. The method of claim 1, further comprising:
   detecting an anomaly in the distributed application based on a comparison of a port, protocol, or domain specified in the egress traffic data in the collected first network traffic data and a port, protocol, or domain specified in the egress traffic data in the collected second network traffic data.

3. The method of claim 1, further comprising:
   determining a first data rate to all workload IDs specified in the egress traffic data in the collected first network traffic data and a second data rate to all workload IDs specified in the egress traffic data in the collected second network traffic data; and
   detecting an anomaly in the distributed application based on a comparison of the first data rate and the second data rate.

4. The method of claim 1, further comprising:
   detecting an anomaly in the distributed application based on the ingress traffic data in the collected first network traffic data and the ingress traffic data in the collected second network traffic data.

5. The method of claim 4, wherein:
the anomaly is detected in the distributed application based on a comparison of a frequency of private IP addresses specified in the ingress traffic data in the collected first network traffic data and a frequency of private IP addresses specified in the ingress traffic data in the collected second network traffic data.

6. The method of claim 4, further comprising:
determining a first data rate to all workload IDs specified in the ingress traffic data in the collected first network traffic data and a second data rate to all workload IDs specified in the ingress traffic data in the collected second network traffic data, wherein
the anomaly is detected in the distributed application based on a comparison of the first data rate and the second data rate.

7. The method of claim 1, further comprising:
detecting an anomaly in the distributed application based on the inter-workload traffic data in the collected first network traffic data and the inter-workload traffic data in the collected second network traffic data.

8. The method of claim 7, further comprising:
determining a first data rate to a particular workload ID specified in the inter-workload traffic data in the collected first network traffic data, and a second data rate to the particular workload ID specified in the inter-workload traffic data in the collected second network traffic data, wherein
the anomaly is detected in the distributed application based on a comparison of the first data rate and the second data rate.

9. The method of claim 7, further comprising:
determining a first data rate to all workload IDs specified in the inter-workload traffic data in the collected first network traffic data and a second data rate to all workload IDs specified in the inter-workload traffic data in the collected second network traffic data, wherein
the anomaly is detected in the distributed application based on a comparison of the first data rate and the second data rate.

10. A computing system for detecting anomalies in a distributed application that runs on a plurality of nodes to execute a plurality of workloads, said computing system comprising:
a storage device in which first network traffic data of the workloads at a number of different times during a first period of execution of the workloads and second network traffic data of the workloads at a number of different times during a second period of execution of the workloads after the first period of execution, are collected, wherein the first network traffic data includes egress traffic data, ingress traffic data, and inter-workload traffic data and the second network traffic data includes egress traffic data, ingress traffic data, and inter-workload traffic data; and
an anomaly detection server configured to detect an anomaly in the distributed application based on a comparison of a frequency of private IP addresses specified in the ingress traffic data in the collected first network traffic data and a frequency of private IP addresses specified in the ingress traffic data in the collected second network traffic data.

11. The computing system of claim 10, wherein the anomaly detection server is further configured to:
detect an anomaly in the distributed application based on the egress traffic data in the collected first network traffic data and the egress traffic data in the collected second network traffic data.

12. The computing system of claim 11, wherein
the anomaly is detected in the distributed application based on a comparison of a port, protocol, or domain specified in the egress traffic data in the collected first network traffic data and a port, protocol, or domain specified in the egress traffic data in the collected second network traffic data.

13. The computing system of claim 11, wherein
the anomaly is detected in the distributed application based on a comparison of a frequency of private IP addresses specified in the egress traffic data in the collected first network traffic data and a frequency of private IP addresses specified in the egress traffic data in the collected second network traffic data.

14. The computing system of claim 11, wherein the anomaly detection server is further configured to:
determine a first data rate to all workload IDs specified in the egress traffic data in the collected first network traffic data and a second data rate to all workload IDs specified in the egress traffic data in the collected second network traffic data, wherein
the anomaly is detected in the distributed application based on a comparison of the first data rate and the second data rate.

15. The computing system of claim 10, wherein the anomaly detection server is further configured to:
determine a first data rate to all workload IDs specified in the ingress traffic data in the collected first network traffic data and a second data rate to all workload IDs specified in the ingress traffic data in the collected second network traffic data; and
detect an anomaly in the distributed application based on a comparison of the first data rate and the second data rate.

16. The computing system of claim 10, wherein the anomaly detection server is further configured to:
detect an anomaly in the distributed application based on the inter-workload traffic data in the collected first network traffic data and the inter-workload traffic data in the collected second network traffic data.

17. The computing system of claim 16, wherein the anomaly detection server is further configured to:
determine a first data rate to a particular workload ID specified in the inter-workload traffic data in the collected first network traffic data, and a second data rate to the particular workload ID specified in the inter-workload traffic data in the collected second network traffic data, wherein
the anomaly is detected in the distributed application based on a comparison of the first data rate and the second data rate.

18. The computing system of claim 16, wherein the anomaly detection server is further configured to:
determine a first data rate to all workload IDs specified in the inter-workload traffic data in the collected first network traffic data and a second data rate to all workload IDs specified in the inter-workload traffic data in the collected second network traffic data, wherein
the anomaly is detected in the distributed application based on a comparison of the first data rate and the second data rate.

* * * * *